Sept. 8, 1964 R. L. SNYDER 3,148,358
HIGH SPEED MEMORY ELEMENTS
Filed Oct. 30, 1961 7 Sheets-Sheet 1

INVENTOR.
RICHARD L. SNYDER,
BY
Walter J. Adam
ATTORNEY.

Sept. 8, 1964 R. L. SNYDER 3,148,358

HIGH SPEED MEMORY ELEMENTS

Filed Oct. 30, 1961 7 Sheets-Sheet 2

INVENTOR.
RICHARD L. SNYDER,
BY Walter J. Adam
ATTORNEY

INVENTOR.
RICHARD L. SNYDER,
BY
Walter J. Adam
ATTORNEY

Sept. 8, 1964 R. L. SNYDER 3,148,358

HIGH SPEED MEMORY ELEMENTS

Filed Oct. 30, 1961 7 Sheets-Sheet 4

INVENTOR.
RICHARD L. SNYDER,
BY Walter J. Adam
ATTORNEY

Sept. 8, 1964 R. L. SNYDER 3,148,358

HIGH SPEED MEMORY ELEMENTS

Filed Oct. 30, 1961 7 Sheets-Sheet 5

INVENTOR.
RICHARD L. SNYDER,
BY
Walter J. Adam
ATTORNEY.

INVENTOR.
RICHARD L. SNYDER
BY
Walter J. Adam
ATTORNEY.

INVENTOR.
RICHARD L. SNYDER,
BY Walter J. Adam
ATTORNEY.

United States Patent Office 3,148,358
Patented Sept. 8, 1964

3,148,358

HIGH SPEED MEMORY ELEMENTS

Richard L. Snyder, Malibu, Calif., assignor to Hughes Aircraft Company, Culver City, Calif., a corporation of Delaware Filed Oct. 30, 1961, Ser. No. 148,335
17 Claims. (Cl. 340—174)

This invention relates to computer memory systems and particularly to reliable and high speed binary elements and memory arrays utilizing thin film cores and providing non-destructive reading by a new mode of switching.

In conventional random access magnetic core memories utilizing round ferrite cores as the storage elements, the materials of the cores limit the switching speed to a minimum of approximately $10^{-7}$ seconds. The switching speed of conventional cores has been found to be a serious limitation for high speed computer operation. Also, the large physical volume required of conventional cores makes the use of relatively long conductors necessary which introduces propagation delays that decrease the speed of operation. Furthermore, in very fast switching applications, ferrite cores have such large cross sections that their flux content is great enough to require excessive switching voltages. Memory cores composed of very thin films of magnetic material have the advantage of switching with less voltage and power than ferrite cores and have unique switching characteristics which make them even more desirable than conventional cores. Conventional cores depend for their switching operation on rectangular magnetic hysteresis loop characteristics. Consequently, selection of one from a group is accomplished by algebraic summation of a number of exciting fields. Thin film cores are highly oriented and can be switched in a rotational mode by a combination of perpendicular fields. One of the fields can be of the same polarity during switching in either direction. This unidirectional field can also be used to interrogate the core without switching. Consequently, non-destructive reading can be easily accomplished with thin films, whereas with conventional cores special configurations are required.

In the prior art, one of the major difficulties encountered in using thin film cores has been the lack of a geometry which will accommodate a closed magnetic path. Thus, thin film cores when utilized have open magnetic circuits with the result that such cores must be spaced at relatively great distances to prevent interaction of their radiated fields. Memory arrays utilizing these conventional thin film cores form large structures and require long conductors. This invention discloses reliable and high speed memory elements and systems utilizing circularly oriented thin film cores having closed magnetic circuits.

It is therefore an object of this invention to provide a simplified, easily constructed and highly reliable binary memory element.

It is a further object of this invention to provide a binary memory element utilizing a circularly oriented magnetic core and selectively providing non-destructive read out.

It is another object of this invention to provide a highly compact memory array that is easily constructed and may be operated at a relatively high speed.

It is still another object of this invention to provide an improved thin film random access memory which has a high speed of operation, a low power requirement and a high degree of reliability.

Briefly, in accordance with this invention, a memory element is provided utilizing a thin film core having circularly oriented magnetic dipole elements, that is, all of the dipole elements are circularly aligned in the absence of an external magnetic field. A first and second bias current conductor are positioned on opposite sides of the core to provide a radial bias field relative to the axis of the core, the radial bias field being of either polarity relation. A central conductor is positioned through the core to selectively apply a circular switching field to the core. In response to the radial bias field the magnetic dipole elements are disturbed to develop a read-out signal in the central conductor indicative of the stored binary state of the core. Because the core returns to the initial state upon removal of the bias field, the core may be utilized for non-destructive read-out. For writing, the core responds to the application of the circular switching field in the presence of the radial bias field to switch to an opposite binary state. Also, in accordance with the invention, simplified and high speed memory systems are provided utilizing the principles of the improved memory element.

The novel features which are believed to be characteristic of the invention, both as to its organization and method of operation, together with further objects and advantages thereof, will be better understood from the following description considered in connection with the accompanying drawings, in which like characters refer to like parts, and in which.

Figures 1, 2:
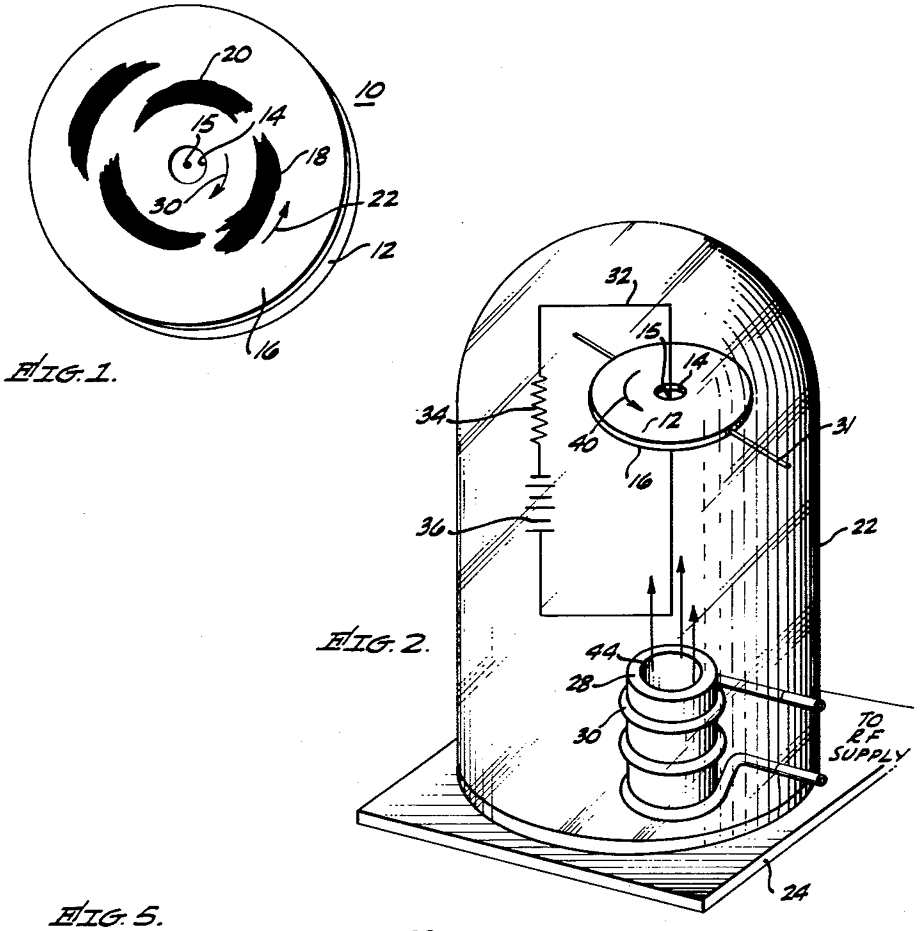
FIG. 1 is a schematic perspective view of a thin film circularly oriented magnetic core which may be utilized in the memory elements and arrays of invention.
FIG. 2 is a schematic perspective drawing of the vacuum deposition equipment for forming the circular oriented cores such as shown in FIG. 1.

Referring first to FIG. 1, one arrangement of a circularly oriented core 10 utilized in this invention includes a non-magnetic substrate 12 and a thin film 16 of circularly oriented material attached or joined to the non-magnetic substrate 12. Although the film 16 is the magnetic core element, the core will be generally referred to as core 10 for convenience of description. The thin film 16 and the substrate 12 may be circular in shape with a centrally disposed hole 14 therein having a central axis 15. As will be discussed subsequently, the film 16 may be formed on the substrate 12 by techniques such as by electro deposition, vacuum deposition or gaseous vapor reduction. The non-magnetic substrate 12 may be any material having non-magnetic properties such as glass, anodized aluminum, suitable plastic, ceramic or a non-conductive metal, for example. The core 10 after formation has a magnetic orientation in a circular path around the hole 14, with all magnetic elements of the material oriented in a direction perpendicular to the radii in a stable manner. Magnetic orientation is that property of a material that causes the molecular magnets or elements to arrange themselves perpendicular to a particular surface in the absence of an external magnetic field. This circular arrangement of the magnetic elements is permanent and is only temporarily changed in the presence of external fields. Although the magnetic elements are generally considered as dipoles, they may be the one or more molecules or molecular magnets in the material. It is believed that a large group of molecules in the film 16 are bonded by a lattice structure such that the magnetic axis of the molecule, molecules or molecular magnets all lie perpendicular to a given line at any point and in a common plane. The arrangement of domains including the magnetic dipoles or elements of the film 16 may be seen in a Kerr magneto-optical apparatus to appear similar to that shown in FIG. 1 by first applying for a short period a non-circular local external field, that is, not circular around the axis 15, so that regions of opposite polarity are developed. For this demonstration, domains such as 18 and 20 shown as dark regions and polarized in a direction shown by an arrow 22, for example, have magnetic elements or dipoles arranged therein in circular paths around the axis 15 with a polarity opposite to the main body of the film which may be polarized in a direction shown by an arrow 30.

The core 10 is always circularly oriented around the axis 15, that is, the magnetic elements have a tendency to assume circular magnetic positions, and in the absence of external magnetomotive forces, all the flux in the film 16 is circularly aligned around the axis 15. Although different regions such as the domain 18 and the adjacent light region with domain walls therebetween can be magnetized in opposite directions after formation of the core 10 is completed in response to a non-circular external field as discussed above, their shape is always a segment of a circle. When magnetized with the domains such as 18, that is, applying and removing a non-circular external field, all magnetic elements have their poles circularly aligned except at the domain walls. The magnetic elements or dipoles at the domain walls will always return to the magnetic circular alignment when subjected to a field circular around the axis 15. Thus, the orientation of the molecular magnets or dipoles or the condition of least energy is always circular around the axis 15. As will be discussed subsequently, this circular orientation provides a new mode of rotational switching for a non-destructive read-out memory element.

Another advantage of the circularly oriented core 10 is the absence of "snapback" during switching, which in a conventional linear orientated core, minor regions are magnetized at polarities opposite to the main domain resulting in variable induction and variable effective coercivity. To further explain this "snapback" effect, the reluctance of the non-magnetic path is high enough that more magnetomotive force or a higher density of lines of flux is required to support the flux where emerging from the thin film such as in a linear oriented film, than the coercivity of the material can supply to overcome the unbalance of magnetic forces. Therefore, regions near the ends of the films in a conventional arrangement, reverse themselves to produce jagged or sawtooth shaped domain walls. This jagged shape is assumed by the material to increase the length of the walls at the edge of the material so that the density of the flux that emerges from these walls is considerably less than otherwise could emerge therefrom. Therefore, the shape of the domain walls automatically adjusts itself to such an angle that the flux density is reduced to that value that can be supported by the coercivity of the film. The result of this "snapback" effect is that in different switching operations different amounts of material are switched to an opposite polarity and the required switching current and the output signals vary. However, because of the circular orientation of the core 10 in accordance with this invention providing a closed internal magnetic path for the lines of flux, the required balance of magnetomotive forces at the edge of the film and the undesired "snapback" effect are eliminated.

Referring now to FIG. 2 which shows the structure for forming the circularly oriented core 10 by a vacuum depositing arrangement, a bell jar 22 is fitted on a suitable base 24 with a high vacuum retained in the jar 22 by conventional means (not shown). A thermal source is provided including a crucible 28 having a resistance wire 30 wrapped thereabound and passed through the jar to a suitable source of RF (radio frequency) energy. The glass substrate 12 is mounted in the jar 22 by suitable retaining structure such as 31.

For developing the circular oriented film 16 in the plane of the glass substrate 12, a conductor or lead 32 is positioned along the axis 15 of the central hole 14 and coupled at one end through a current limiting resistor 34 to the negative terminal of a battery 36 to form a current source. The central lead 32 is coupled at the other end to a positive terminal of the battery 36. The conductor 32, for example, may be nickel clad double ceramic copper wire to withstand the relatively high temperatures. Thus, the lead 32 forms an essentially circular magnetic field indicated by an arrow 40 around the lead 32 and adjacent to the glass substrate 12. It is to be noted that the lead 32 is extended toward the crucible 38, to prevent shadowing effects during evaporation from the crucible 38. A magnetic material 44 is placed in the crucible 28 and may be 74% nickel and 16% iron in order to result in an 80% and 20% condensate. As the nickel and iron vapors are formed and passed upward in a perpendicular direction to the field indicated by the arrow 40, they are deposited on the glass substrate 12. The circular magnetic field indicated by the arrow 40 overcomes the randomness in orientation of the magnetic elements or dipoles of the deposited material so that a preferential circular alignment is created. Thus, the vapor falling on the substrate 12, is oriented circularly along magnetic lines such as shown by the arrow 40. The circular orientation of the dipoles or magnetic elements is therefore established as discussed relative to FIG. 1. It is to be noted that when formed, the circularly oriented magnetic elements of the film 16 all have the same polarity as determined by the circular magnetic field indicated by the arrow 40. The thickness of the film 16 may range, for example, from about 500 angstrom units to 2500 angstrom units or more depending upon the time provided for deposition. The film 16 is deposited with a relatively constant thickness so that the lines of flux after formation are normally maintained in the core material. It is to be noted that the circularly oriented core in accordance with the principles of the invention may be formed from thin film shapes other than circular.

Figure 3:
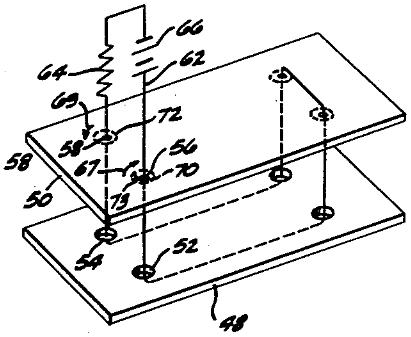
FIG. 3 is a schematic perspective drawing of a masking arrangement to be utilized in the vacuum equipment of FIG. 2 for simultaneously forming a plurality of magnetic cores.

In order to form a plurality of cores simultaneously, a mask 48 of FIG. 3 may be placed adjacent to a substrate 50 of glass or other suitable material with the mask 48 being of a suitable material such as stainless steel. A desired number of circular holes such as 52 and 54 are formed in the mask 48 having the diameter of the completed circular cores. The glass substrate 50 has small circular holes such as 56 and 58 positioned to coincide with the center of the respective holes 52 and 54. A conductor or lead 62 is wound through the holes such as 56 and 58 of the substrate 50 and the holes 52 and 54 of the mask 48 in a continuous manner with the substrate 50 and the mask 48 maintained adjacent and aligned with each other. The lead 62 is coupled at one end through a current limiting resistor 64 to the negative terminal of a source of potential such as a battery 66 and coupled at the other end to the positive terminal of the battery 66. Thus, essentially circular magnetic fields indicated by arrows 67 and 69 are formed at the holes 56 and 58 adjacent to the glass substrate 50. The masked arrangement of FIG. 3 is then mounted in the jar 22 of FIG. 2 and iron-nickel vapor is deposited in the presence of the circular fields such as shown by the arrows 67 and 69, similar to the discussion above, to deposit thin film circularly oriented cores such as 70 and 72 shown dotted on the bottom of the substrate 50.

If desired, the cores such as 70 and 72 may be utilized in a memory system in accordance with this invention including the glass substrate 50, as will be discussed subsequently. Also, it may be desired to remove the cores from the substrate 50 for certain types of memory applications. It has been found that by first vacuum depositing a thin film of copper on the glass substrate 50 through the mask 48, and then depositing the film of iron-nickel material on the copper, the cores are easily removable from the substrate 50 after formation. Thus, copper is first evaporated from a crucible similar to the crucible 28 through the holes such as 52 and 54 either with or without the circular magnetic field to form copper discs as indicated by a film 73 shown dotted. The iron and nickel combination is then deposited through the holes of the mask 48 on top of the copper film such as 73. Thus, two masking steps are required to form the circularly oriented thin film on a copper supporting structure for ease of removal therefrom.

Figure 8:
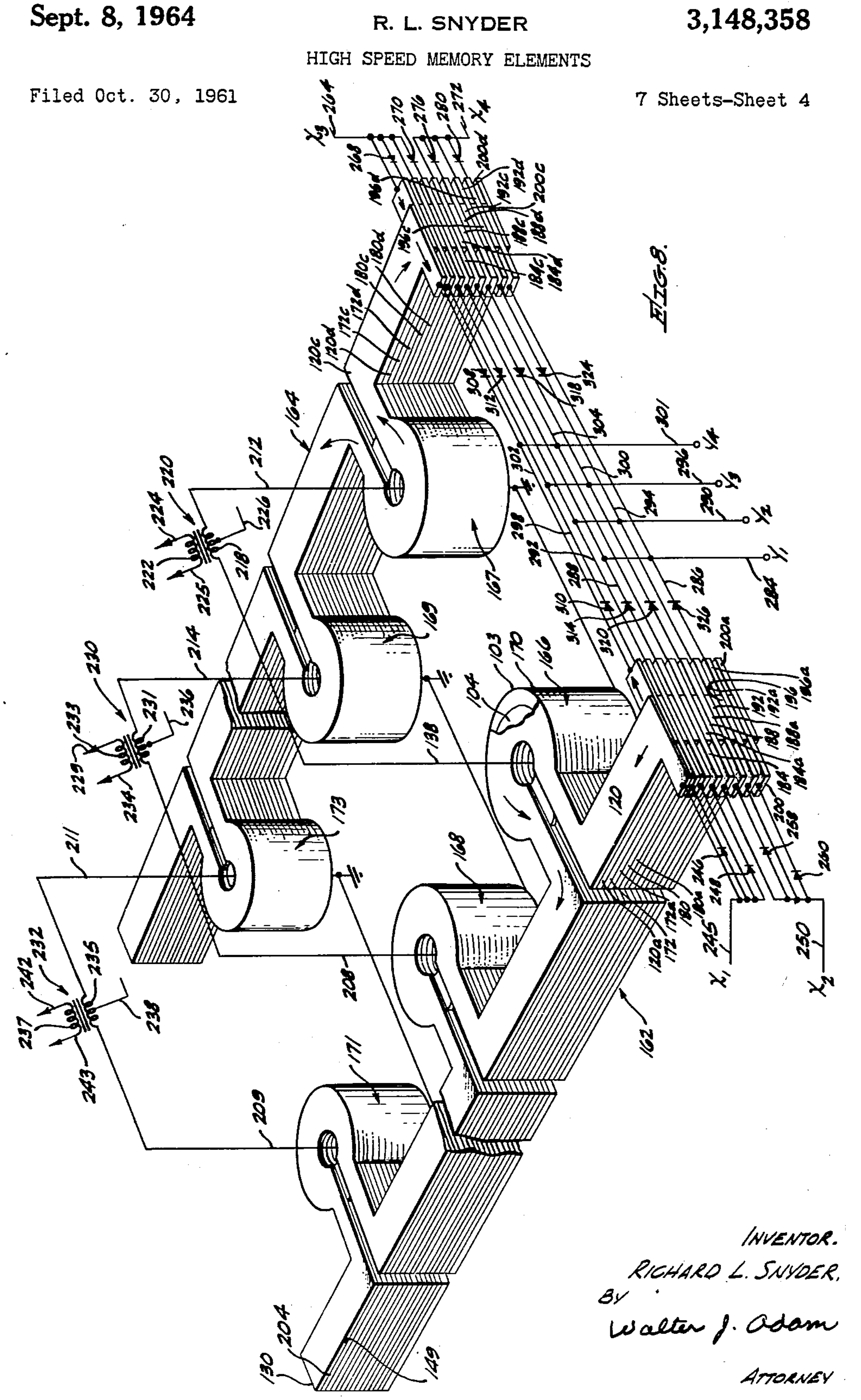
FIG. 8 is a perspective diagram of a high speed memory array in accordance with this invention.
Figures 12, 13:
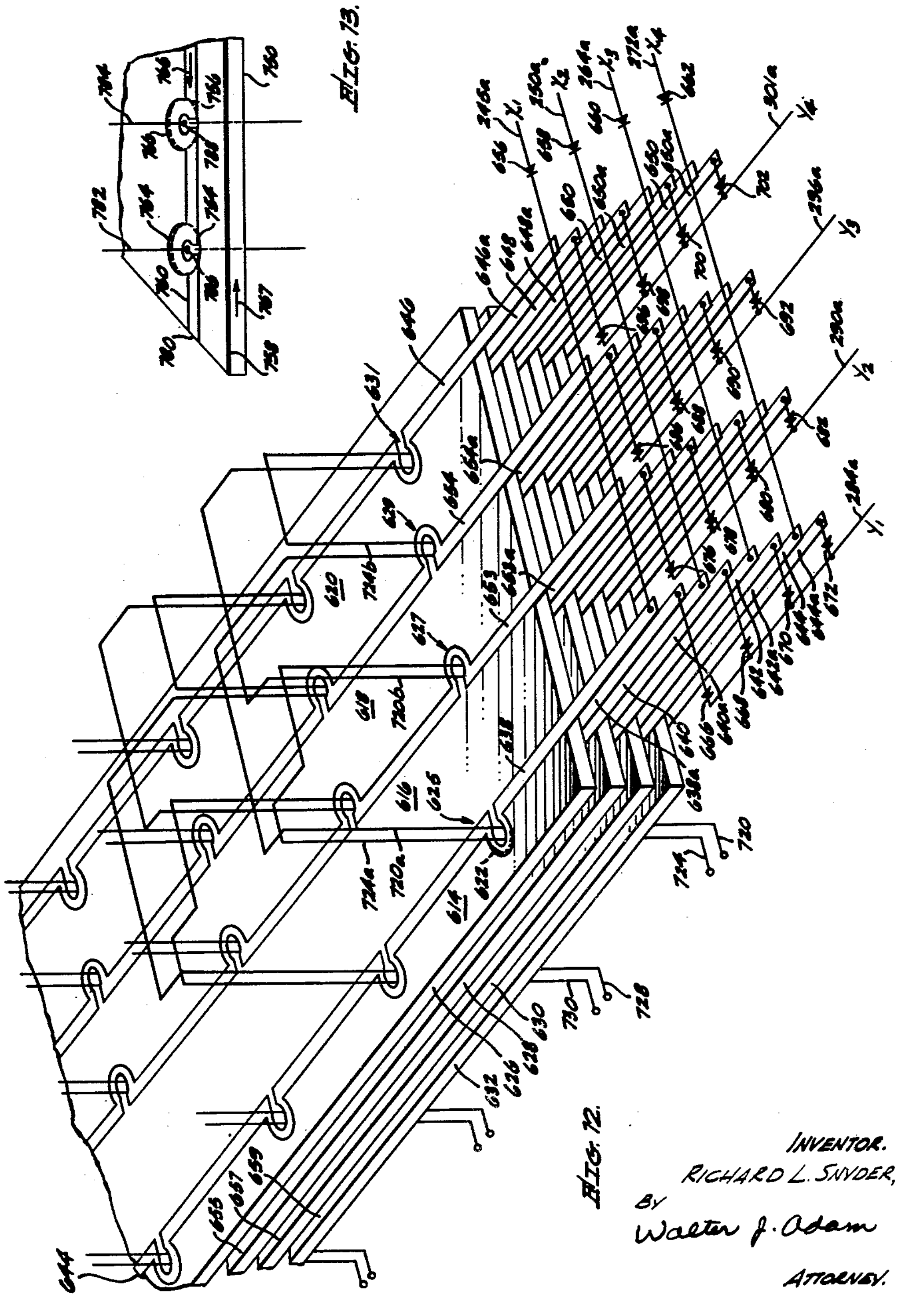
FIG. 12 is a schematic perspective drawing of another arrangement of a memory array in accordance with this invention.
FIG. 13 is a schematic perspective drawing of a simplified arrangement of the memory elements in accordance with this invention.

After the cores such as 70 and 72 have been formed on the substrate 50, a circular bias plate or conductor such as shown in FIGS. 8 and 12 may be formed thereon for the switching operation in accordance with the invention. The switching operation will be discussed in further detail subsequently, but for convenience of explanation one method of forming the bias plates will be discussed by referring to FIG. 4. In order to prevent conduction between the core material such as 72 and the copper bias plate, a thin film or non-conductive material 79 which may be silicon monoxide is placed on the lower side of the substrate 50. A mask 74 of a suitable material such as stainless steel, has an opening 75 therein with partially circular loops or segments such as 76 positioned so as to be centered on the axis of the cores such as 72. The opening 75 is continuous in the mask 74 to bias all cores of a selected word as will be discussed subsequently. Another opening 77 similar to 75 is also provided in the mask 74 with partially circular segments positioned at cores such as 70. The substrate 50 and mask 74 are then positioned and maintained adjacent to each other, mounted in the jar 22 of the depositing equipment of FIG. 2 and copper or other conductive material is deposited through the holes such as 75 of the mask 74 onto the film 73. For depositing a similar bias plate or conductor on the opposite side of the substrate 50, the operation is similar except the film or layer such as 79 of nonconductive material is not required and the bias plate is deposited directly on the substrate 50.

Figure 5:
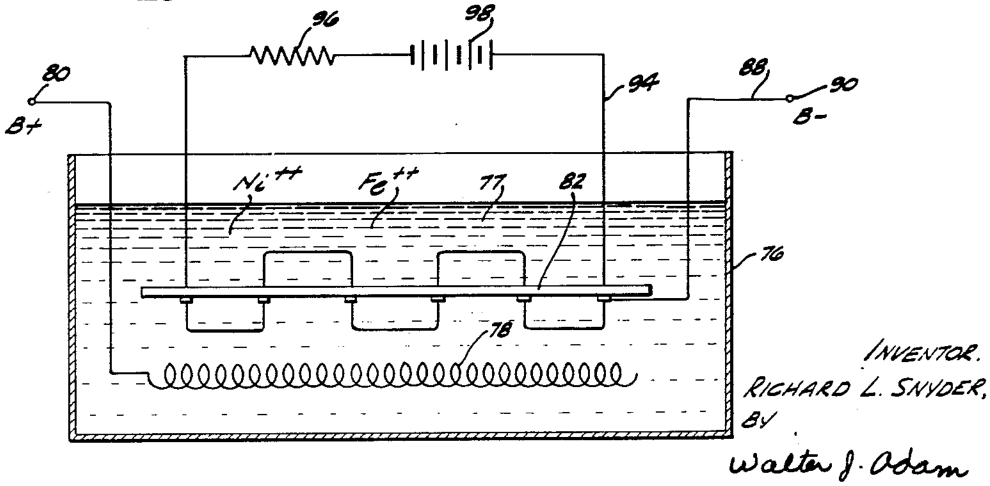
FIG. 5 is a schematic sectional drawing of the equipment for forming the circularly oriented cores of FIG. 1 by an electric deposition method.
Figure 6:
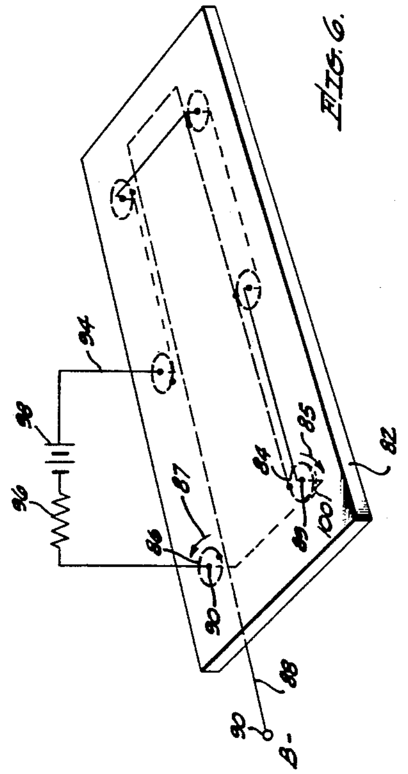
FIG. 6 is a schematic partially perspective drawing showing the arrangement of the non-magnetic substrate and disc shape cores formed in the electro-depositing arrangement of FIG. 5.

Another arrangement and method that may be utilized to form the circularly oriented core is the electro deposition device and method of FIG. 5 including a tank 76 containing a plating bath or electrolyte solution 77 which may contain iron and nickel molecules and other elements. An anode 78 is immersed in the solution 77 of the electrolyte and coupled to a suitable source 80 of positive B+ potential. A glass substrate 82 is positioned in the electrolyte and may have the arrangement of FIG. 6. A plurality of circular copper discs such as 84 and 86 are formed on the substrate 82 such as by the vacuum deposition through a mask discussed above relative to FIG. 3. To form the cathode of the plating bath, a lead 88 is connected to each copper disc such as 84 and 86 from a suitable source 90 of negative or B— potential.

The circular magnetic fields shown by arrows 85 and 87 are formed by a conductor or lead 94 passing continuously through holes such as 89 and 90 formed in the center of each copper disc and through the substrate 82. The lead 94 is coupled at one end through a current limiting resistor 96 to the negative terminal of a source of potential such as a battery 98 to form a current source and coupled at the other end to a positive terminal of the battery 98. During the electrodepositing operation, a thin film of magnetic material such as 100 is formed on the copper discs such as 84 each with the circular orientation of magnetic elements or dipoles similar to the core 10 of FIG. 1 and of the same or reversed polarity. Because the deposition potentials of $Ni^{++}$ and $Fe^{++}$ are relatively close together, both metals are deposited simultaneously on the copper discs with approximately 80% nickel and 20% iron from the plating bath. The temperature of the bath may be held at approximately 50 degrees centigrade, for example.

For the plating bath 77 a composition that has been found to be satisfactory includes per liter of solution, two normal $NiSO_4 \cdot 6H_2O$, one-half normal solution of $$MgSO_4 \cdot 7H_2O$$

and half normal $H_3BO_3$ and a grain of saccharine to relieve tensions. To this solution is added $FeSO_4 \cdot 7H_2O$ in varying amounts to maintain a selected plating ratio of 80:20, Ni:Fe ratio. The plating is carried out with a current density of 1 to 1.5 amperes/decimeters$^2$ at a pH value of 2.5 to 4.

Another method and arrangement, for example, to develop the circularly oriented cores utilized in this invention is a gaseous vapor reduction process in which $Fe(CO)_5$ is heated and reduced to iron which is deposited through a mask onto the glass substrate similar to the arrangement of FIG. 3. At the same time the correct percentage of NiO may be combined with $H_2$ to deposit metallic nickel through the mask onto the substrate. This process is carried out with a conductor in position for developing the circular magnetic field and provide the circularly oriented cores.

Figure 7:
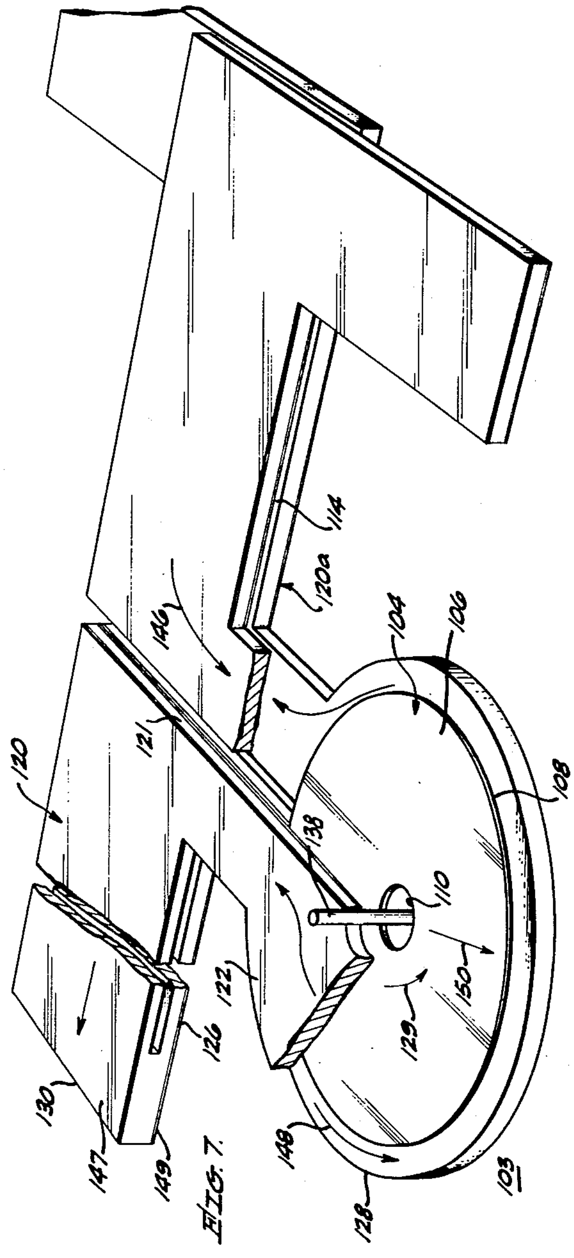
FIG. 7 is a perspective diagram of a non-destructive memory element in accordance with this invention utilizing the circular oriented core of FIG. 1.

As may be seen in FIG. 7, a memory element 103 in accordance with this invention includes a thin film 106 and a substrate 108 generally referred to as a core 104 and having a centrally disposed hole 110 therein. The substrate 108 may be glass or other suitable non-magnetic material. A first bias plate or conductor 120 of a conductive material such as copper is positioned closely adjacent to the non-conductive film 114 and has a partially circular portion 122 of substantially the dimensions of the core 104 for providing a current path around an arc to develop a radial bias field. A thin sheet 114 of a non-conductive material such as deposited silicon monoxide, Mylar or Teflon is positioned on the bias plate 120 at the side of the core 110 adjacent to the film 106. Closely adjacent to the core 104 against the glass substrate 108 is a second bias plate or conductor 120*a* having a partially circular portion 128 with dimensions similar to the portion or segment 122. Each bias plate 120 and 120*a* has a centrally disposed opening coincident with the opening 110 in the core 104 and a slot such as 121. The bias plates 120 and 120*a* are joined at the end 130 so that fields of opposite directions are developed in the circular portions 122 and 128. The current through the bias plates 120 and 120*a* as indicated by arrows 146 and 148 results in radial magnetic forces indicated by an arrow 150 as the axial magnetic forces developed thereby are cancelled. It is to be noted that if the bias current is in a direction opposite to the arrows 146 and 148, the radial field has an inward force opposite to the arrow 150. The bias plates 120 and 120*a* may be formed by conventional techniques such as etching from a thin copper sheet or by depositing techniques. A central switching conductor or lead 138 coated with insulation such as shellac is positioned through the hole 110 to form the complete binary storage element 103.

The rotational switching mode of operation of the memory element 103 in which the individual dipoles or magnetic elements simultaneously change polarity, occurs at a relatively high speed as compared to wall motion switching in which a field in the opposite direction of orientation is applied to cause the domain walls to spread throughout the material until the core is completely switched. In the rotational switching mode, a short current pulse is applied to the core 104 to form a reverse field from that of the stored magnetic state in the presence of a somewhat weaker field at right angles to the direction of orientation and in the plane of the field, that is, a radial field. The switching pulse is applied to the conductor 138 in a selected direction to provide a circular magnetic filed indicated by an arrow 129 at the film 106 in either a first or a second direction around the conductor 138. It is only in the presence of a radial bias field that the direction of magnetization of the core 104 may be permanently changed in response to the circular magnetic field shown by the arrow 129. If the switching pulse applied to the lead 138 occurs in the absence of the bias field, and is of sufficiently short duration, there will be some disturbance of the magnetic particles, but the magnetic system will return to its original condition at the termination of the pulse. Also, if only a radial bias field is applied to the core 104, the magnetic elements or dipoles start to rotate but upon removal of the bias field return to their original state. Reversal of magnetic polarity resulting from a switching pulse applied to the lead 138 in the presence of a radial bias field provides switching in a very short interval of time. It is to be noted that the radial bias field may be of either polarity, that is, current may flow through the bias plates 120 and 120*a* in a direction opposite to the arrows 146 and 148. One theory of this switching in the presence of a bias field is that the magnetic molecules start to rotate due to the radial cross field, and when subjected to the circular reversal field flip over in concert. It is not known whether the magnetic molecules in response to the radial force are skewed in the plane of the flat surface of the core 104 or in a plane at right angles to the flat surface of the core 104.

Another important characteristic of the rotational switching mode of the memory element 103 in accordance with the invention is that non-destructive sensing or reading of the stored magnetic polarity in the core is provided. By subjecting the core 104 to a radial bias field developed from current flowing through the bias plates 120 and 120*a*, the magnetic disturbance may be detected as a voltage in the central conductor 138 caused by the resultant partial rotation of the magnetic molecules. The polarity of the voltage induced in the conductor 138 during reading depends on the polarity of the magnetization of the core 104 and not upon the direction of current flow in the bias conductors 120 and 120*a*. Thus, the bias field may have either the polarity shown by the arrow 150 or opposite thereto without affecting the polarity of a sensed signal. Because the radial bias field may have a direction of force as shown by the arrow 150 or inward toward the axis, inductively coupled driving means may be utilized in which current flows through different pairs of bias plates in opposite directions.

To generally explain the sequence of reading and writing that may be utilized with the memory element 103 for non-destructive reading, reference will be made to the waveforms of FIG. 11. At a first reading time $T_1$, a current pulse of a waveform 144 is applied through the bias plates 120 and 120*a* in a direction which may be the direction indicated by the arrows such as 146 andl 148.

Because the magnetic fields developed in the partially circular sections 122 and 128 are in opposite directions, all forces are cancelled except radial fields of force indicated by the arrow 150. Thus, as discused above, the magnetic molecules start to rotate or precess with resultant lines of flux developing a voltage in the central conductor 138 indicated by a waveform 154. Depending on the circular direction or polarity of stored magnetization of the core 104, the sensed signal of the waveform 154 is positive or negative, which may respectively represent a stored "one" or a "zero." The core 104 has two stable magnetic states. Combination switching is accomplished in oriented thin film cores by the coincidence of a bias and a switching field. It is to be noted that this effect is only realized when the switching pulses are of such short duration that the domain wall motion is not great enough to establish separate domains. Because of the perfect coupling resulting from the circular shape of the core 104, the voltage signal of the wave form 104 is relatively large and because of the absence of the "snap-back" effect, the voltage signal of the waveform 154 is relatively constant in amplitude from one reading time to another.

Now that the radial bias of the arrow 150 is being applied to the core 104, and the output signal of the waveform 154 has been formed, new information may be written into the core 104 at time $T_5$ if desired. It is to be noted that if the initial information is desired to be retained in the memory element 104, the bias pulse of the waveform 144 is terminated subsequent to time $T_5$ and the core 104 returns to its initial state of magnetization. However, if a writing operation is desired, the write current pulse of a waveform 158 is applied to the conductor 138 being, for example, positive for writing a "one" and negative for writing a "zero," that is, current flows through the conductor 138 in a selected direction. The fields resulting from the combination of the pulse of the waveform 158 in the central lead 138 and the bias pulse of the waveform 144 flowing through the bias plates 120 and 120*a* cause the core 104 to switch direction of magnetization when the switching field is in a direction opposite to the stored magnetic state and to remain unchanged except for the effect of the bias when the switching field is in the same direction as the field developed by the initial magnetic state. When the bias current of the waveform 144 terminates after time $T_5$, an output signal of the waveform 154 is sensed but may not be utilized in the previously described read-write cycle.

Thin insulating films 147 and 149 such as Teflon or Mylar are placed between adjacent memory elements (not shown) for insulating the bias plates in a completed array, as will be explained subsequently.

As an example of operation of the memory element 103 switching currents of the waveform 158 range from 0.5 to 1.5 amperes for washer shaped or circular cores 104 ranging from 1/16" to 3/16" in diameter with coercivities in the range of 1.5 to 3 oersteds. Bias currents for bias conductors or plates 120 and 120*a* for the above range of thin film core diameters range from 30 to 100 milliamperes. For special purposes these parameters may be varied over wide ranges. Thus, the cores utilized in the invention have magnetic orientation with a relatively low coercivity.

Because the cores of the memory elements such as 103 are formed on thin substrates such as glass and the bias conductors such as 120 and 120*a* are very thin, a large number of memory elements such as 103 may be stacked in a very compact column. This dense packaging of the cores permits the use of very short sense and control conductors so that small inductance and negligible signal propagation delay is present. Also, as discussed previously, because the flux in the core 104 has a closed internal path, that is, the material is oriented in a curved path which closes, fields of undisturbed cores remain in the material and are unaffected by changes of adjacent cores. This condition permits the very close spacing of cores in any array as mentioned above.

Referring to the memory array of FIG. 8, a circularly oriented disc memory in accordance with this invention including a plurality of the memory elements such as 103 of FIG. 7 is word organized for random selection of desired words. A first stack 162 and a second stack 164 are shown with the number of binary bits per word equal to the number of columns of memory elements such as columns 166, 168 and 171 in the stack 162 and columns 167, 169 and 173 in the stack 164. Thus, the number of words stored in the memory is equal to the number of stacks times the number of layers of memory elements in each stack. For example, the first column 166 of the stack 162 stores the first or most significant bits of 8 words stored in that stack and the second column 168 stores the second bits of the 8 words. The stack 164 is organized in a similar manner with the columns 167 and 169 storing respectively the first and second bits of the eight words which may be stored therein.

Referring also to FIG. 7, the structure of each binary element of each column such as 166 is similar to the binary element 103. Thus, the binary element 103 includes the bias plates 120 and 120*a* and a memory element 170 directly below the element 103 includes bias plates 172 and 172*a*. The memory element 170 for storing the first bit of a second word includes a circularly oriented core. Thin Mylar films such as the film 149 similar to the element 103 of FIG. 7 are provided between each adjacent word of memory elements. Also, each memory element such as 103 includes a thin film of non-conductive material such as 114 to insulate the magnetic film from the conductor such as 120*a*. The third word elements of the stack 162 include bias plates 180 and 180*a*, the fourth word elements include bias plates 184 and 184*a*, the fifth word elements include bias plates 188 and 188*a*, the sixth word elements include bias plates 192 and 192*a*, the seventh word elements include bias plates 196 and 196*a* and the eighth word elements include bias plates 200 and 200*a*. The two bias plates on both sides of each circularly oriented core are joined together at one end such as the bias plates 120 and 120*a* being joined at 147 and the bias plates 172 and 172*a* being joined at 204 to form a complete electric circuit with current flowing in opposite directions on the two sides of each circularly oriented within film core such as 104. The stack 164 is arranged in a similar manner with the corresponding upper and lower bias plates having similar numbers but with respective subscripts *c* and *d*, and will not be explained in further detail.

The sensing and switching of the cores such as 104 is accomplished by conductors passing through the holes in the cores of each stack such as the lead 138 passing through the central hole of the column 166, a lead 208 passing through the column 168, a lead 209 passing through the column 171, a lead 212 passing through the column 167, a lead 214 passing through the hole in the column 169 and a lead 211 passing through the hole in the column 173. In one arrangement in accordance with this invention, the leads 138 and 212 are coupled to a first winding 218 of a sensing transformer 220 so as to cancel undesired noise signals developed by the cores between the stacks 162 and 164 during writing. A second winding 222 is coupled to leads 224 and 225 through which is applied the sensed signals to circuitry to be described. A write lead 226 is coupled to a center tap of the winding 218 for writing into the memory elements of the first bits of a selected word. In a similar manner a transformer 230 has a first winding 231 coupled to the leads 208 and 214 and a transformer 232 has a first winding 235 coupled to the leads 209 and 211. The sense transformer 230 has a second winding 233 coupled to leads 229 and 234 and the sense transformer 232 has a second winding 237 coupled to leads 242 and 243. The sense transformers 230 and 232 respectively have write leads 236 and 238 coupled to center taps of the windings 231 and 235 for writing into bit elements of a selected word.

The bias plates or word selecting conductors are connected at one end to selection leads which may be called X selection leads and at the other end to selection leads which may be called Y selection leads. As discussed above, the bias plates pass first over the top of the cores of a word and then return beneath those cores to form a continuous current path. An $X_1$ selection lead 245 is coupled in parallel to the bias plate 120, to the bias plate 172, through the anode to cathode path of a diode 246, to the bias plate 180, and to the bias plate 184 through a diode 248. An $X_2$ selection lead 250 is coupled to the bias plate 188, to the bias plate 192 through a diode 258, to the bias plate 196 and to the bias plate 200 through a diode 260. An $X_3$ selection lead 264 is coupled in parallel to the bias plate 120*d*, to the bias plate 172*d* through the anode to cathode path of a diode 268, to the bias plate 180*d* and to the bias plate 184*d* through a diode 270. An $X_4$ selection lead 272 is coupled to the bias plate 188*d*, to the bias plate 192*d* through the anode to cathode path of a diode 276, to the bias plate 196*d* and to the bias plate 200*d* through a diode 280.

A $Y_1$ selection lead 284 is coupled to leads 286 and 288, a $Y_2$ selection lead 290 is coupled to leads 292 and 294, a $Y_3$ selection lead 296 is coupled to leads 298 and 300 and a $Y_4$ selection lead 301 is coupled to leads 302 and 304. The lead 302 is coupled to the bias plate 120*a* and to the bias plate 120*c* through a diode 308, the lead 298 is coupled to the bias plate 172*a* through a diode 310 and to the bias plate 172*c*, the lead 292 is coupled to the bias plate 180*a* and to the bias plate 180*c* through a diode 312, and the lead 288 is coupled through a diode 314 to the bias plate 184*a* and to the bias plate 184*c*. In a similar manner, the lead 304 is coupled to the bias plate 188*a* and to the bias plate 188*c* through a diode 318, the lead 300 is coupled to the bias plate 192*a* through a diode 320 and to the bias plate 320*c*, the lead 294 is coupled to the bias plate 196*a* and to the bias plate 196*c* through a diode 324 and the lead 286 is coupled to the bias plate 200*a* through a diode 326 and to the bias plate 200*c*. All of the diodes have a polarity so that current flows from a selected X lead to a selected Y lead.

Figure 9:
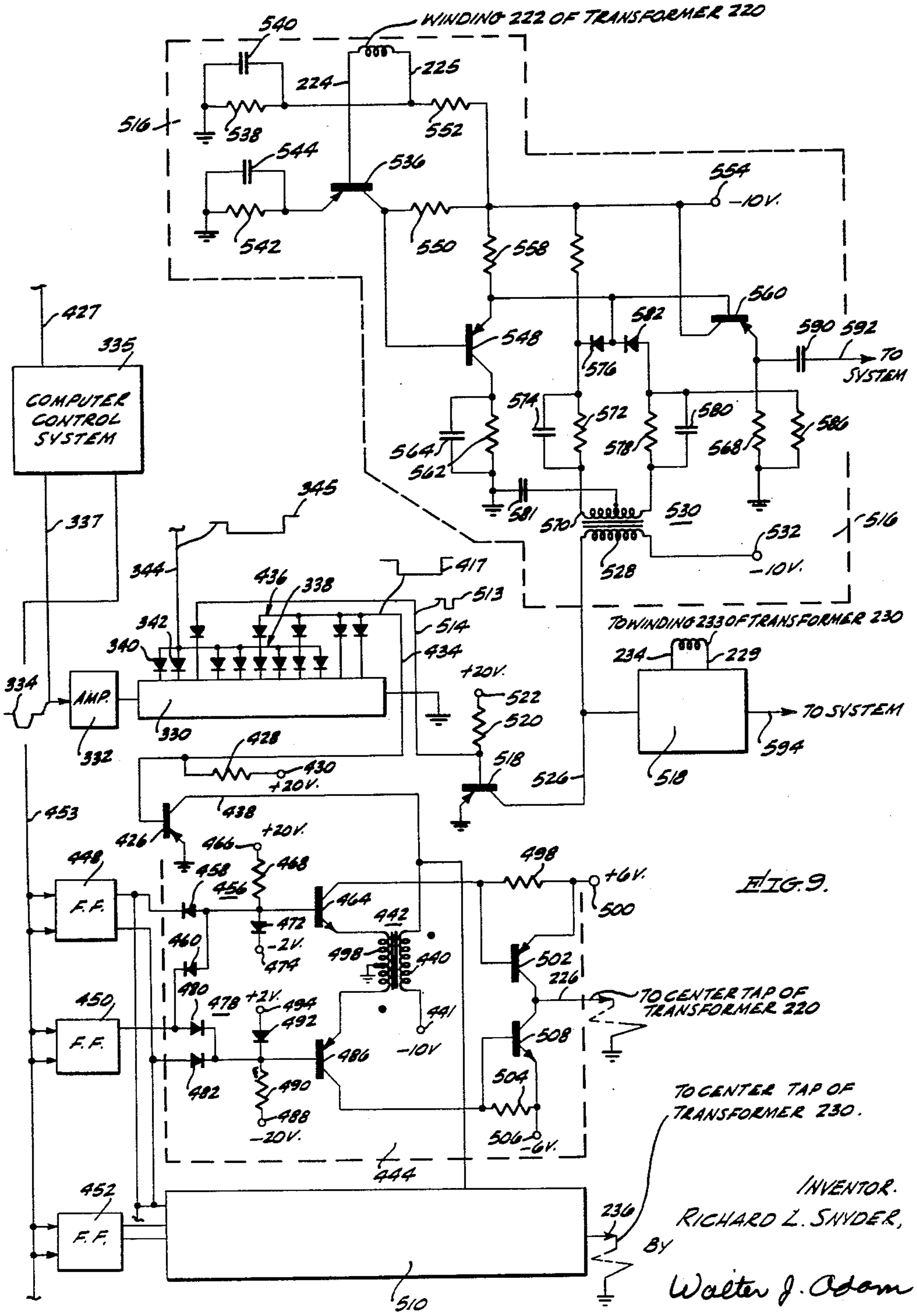
FIG. 9 is a schematic circuit diagram of an addressing arrangement in accordance with the invention which may be utilized with the memory array of FIG. 8.
Figure 10:
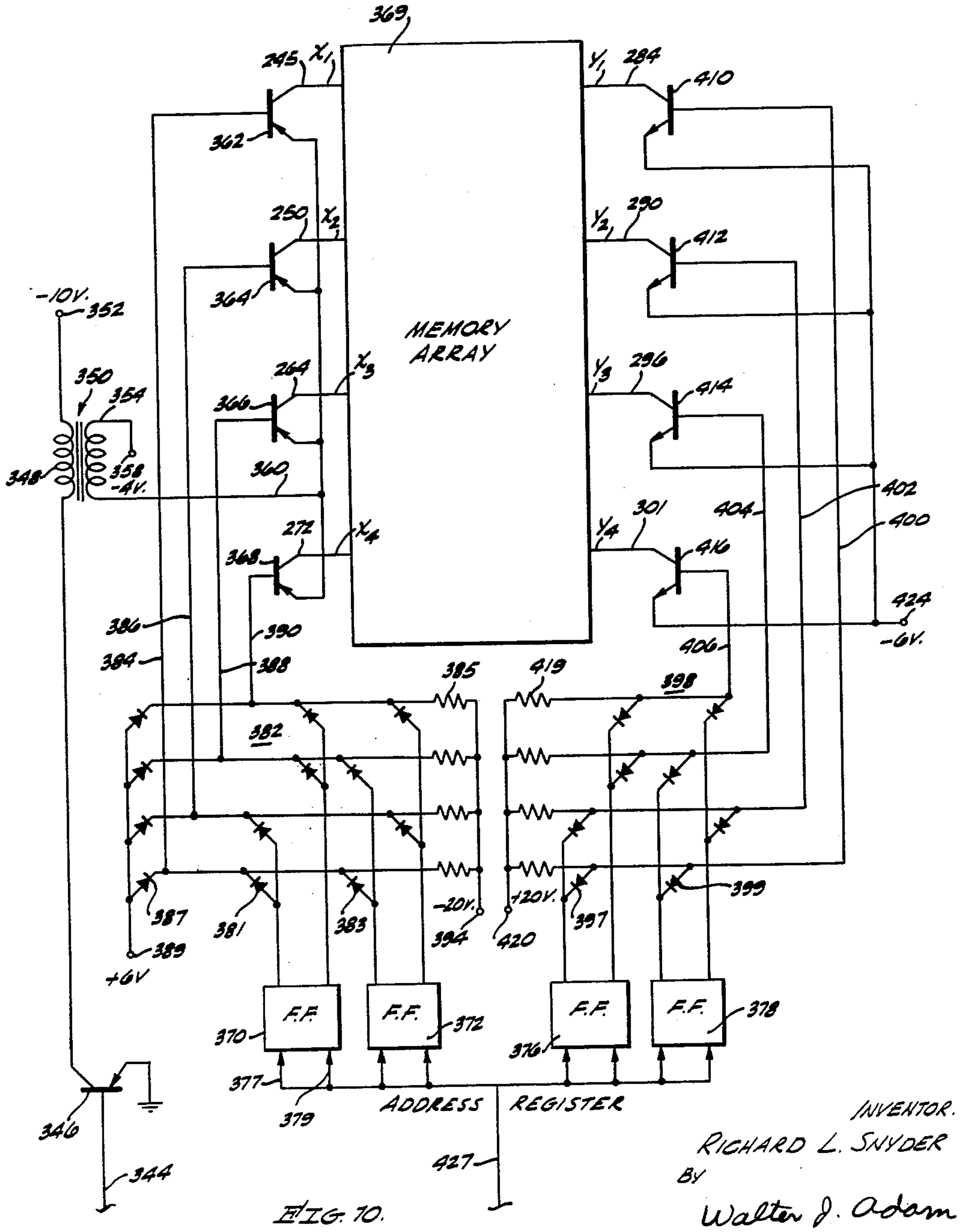
FIG. 10 is a schematic circuit diagram of the reading and writing circuits in accordance with this invention which may be utilized with the memory array of FIG. 8.

Referring now also to the schematic circuit diagrams of FIGS. 9 and 10, the memory system of FIG. 8 may be timed by properly terminated delay line 330 responsive to an initiate pulse of a waveform 334 applied from the timing circuitry of a computer control system 335, for example, through a lead 337 and an amplifier 332 to the delay line 330. Because pulses longer than the initiate pulse are required, multiple taps are coupled to the delay line 330 whose outputs are combined in diode "or" gates such as 338. As the read timing pulse of a waveform 345 is relatively long, a plurality of diodes such as 340 and 342 form the "or" gate 338 coupled to a lead 344 which in turn is coupled to a base of a p-n-p type inverting transistor 346 (FIG. 10). The transistor 346 has an emitter coupled to ground and a collector coupled through a winding 348 of a transformer 350 to a −10 volt terminal 352. A second winding 354 of the transformer 350 has one end coupled to a −4 volt terminal 358 and the other end coupled to a lead 360 which in turn is coupled to the emitters of a plurality of X driver transistors 362, 364, 366, and 368, all of the p-n-p type. The driver transistors 362, 364, 366 and 368 respectively have collectors coupled to the X selection leads 245, 250, 264 and 272 as shown in FIG. 8 and which are coupled to a memory array 369 representing the stacks 162 and 164 of FIG. 8, for example.

For addressing selected words of the memory system of FIG. 8, a first pair of address register flip flops 370 and 372 and a second pair of address register flip flops 376 and 378 are provided to form an address register, each with a first and second input lead such as 377 and 379. The output signals of the flip flops 370 and 372 which may be any of four combinations of "zeros" and "ones," that is, low or high voltages, are applied to a conventional diode "and" gate matrix 382. Diodes such as 381 and 383 are included in the matrix 382 and arranged so that each binary combination stored in the flip flop 370 and 372 causes a low voltage signal to be formed on only one of output leads 384, 386, 388 or 390 which in turn are respectively coupled to the bases of X driver transistors 362, 364, 366 and 368. Each of the leads 384, 386, 388 and 390 is coupled at one end through resistors such as 385 to a −20 volt terminal 394. Clamping diodes such as 387 are coupled between a +6 volt terminal 389 and the leads 384, 386, 388 and 390 to clamp all leads except the selected one at +6 volts. Because the diode logical selection circuit 382 is well known in the art, it will not be explained in further detail.

The binary combinations stored in the flip flops 376 and 378 also control a diode selection circuit 398 having diodes such as 397 and 399 arranged similar to the logical circuit 382, except reversed in polarity. The signals applied to the logical circuit 398 form a high voltage signal on a selected one of leads 400, 402, 404 or 406 respectively coupled to the bases of n-p-n type Y driver transistors 410, 412, 414 and 416. The leads 400, 402, 404 and 406 are coupled through resistors such as 419 to a +20 volt terminal 420 which, as is well known in the art, allows a positive signal to be applied to the selected lead. The Y driver transistors 410, 412, 414 and 416 have emitters coupled to a −6 volt terminal 424 and have collectors respectively coupled to the X selection leads 284, 290, 296 and 301 which in turn are coupled to the memory array 369.

The above described address circuits pass current through the upper and lower bias plates of the circular oriented cores in a selected word of the memory system of FIG. 8 for reading as well as for writing. Combinations of binary address signals are applied to the input leads of the flip flops 370, 372, 376 and 378 through a plurality of leads indicated as a composite lead 427 from the computer control system 335. For forming write timing pulses similar to a waveform 417, a p-n-p type transistor 426 has an emitter coupled to ground and a base coupled through a biasing resistor 428 to a +20 volt source of potential 430 and through a lead 434 to an "or" gate 436 coupled to the delay line 330 which forms the write pulse of relatively long duration of the waveform 417. The collector of the transistor 426 is coupled through a lead 438 to one end of a first winding 440 of a transformer 442 included in a write control circuit 444. The other end of the winding 440 is coupled to a −10 volt terminal 441.

The write control circuit 444 is controlled by the signal on the lead 438 similar to the waveform 417 except inverted, by a write control flip flop 448 and by a digit register flip flop 450. Other write control circuits such as 510 are provided, with one for each bit position of the words stored in the memory array of FIG. 8. Thus, one digit register flip flop such as 450 and 452 is provided for each sense amplifier transformer such as 220 and 230 of FIG. 8. The control flip flop 448 and digit register flip flops such as 450 and 452 are set to selected binary states by information applied thereto as shown by a waveform 608 (FIG. 11) from the computer control system 335 through leads indicated as a composite lead 453. A first "and" gate 456 includes a diode 458 having a cathode coupled to the control flip flop 448 and a diode 460 having a cathode coupled to the digit register 450 for responding to the first digit position of the words in the memory array 369. The anodes of the diodes 458 and 460 are coupled to the base of an n-p-n type transistor 464 and to a +20 volt terminal 466 through a resistor 468 as well as through the anode to cathode path of a diode 472 to a −2 volt terminal 474. A second "and" gate 478 includes a diode 480 having an anode coupled to the single output of the digit register flip flop 450 and a diode 482 having an anode coupled to the other output of the control flip flop 448. The cathodes of the diodes 480 and 482 are coupled to the base of a p-n-p type transistor 486 as well as to a −20 volt terminal 488 through a resistor 490. The cathodes of the diodes 480 and 482 are also coupled through the cathode to anode path of a diode 492 to a +2 volt terminal 494. A second winding 498 of the transformer 442 having a grounded center tap is coupled between the emitters of the transistors 464 and 486. The collector of the transistor 464 is coupled through a biasing resistor 498 to a +6 volt terminal 500 and to the base of a p-n-p type transistor 502 having an emitter coupled to the terminal 500. The collector of the transistor 486 is coupled through a resistor 504 to a −6 volt terminal 506 as well as to the base of an n-p-n type transistor 508 having an emitter coupled to the −6 volt terminal 506. The collectors of the transistors 502 and 508 are coupled to the write lead 226 which in turn is coupled to the center tap of the transformer 220 of FIG. 8 for passing writing current of a waveform 158 (FIG. 11) through the central leads 138 and 212 to ground.

The second write control circuit 510 is responsive to the digit register flip flop 452, to the write timing signal on the lead 438 and to the control signal of the write control flip flop 448 to apply writing pulses to the lead 236. Thus, writing current pulses are applied to the center tap of the second sense amplifier 230 of FIG. 8. It is to be noted that additional write control circuits are provided for each sense amplifier transformer such as 232 of the memory system of FIG. 8 but are not shown for convenience of illustration.

Thus, when a positive signal is applied to the cathode of the diode 458, which permits writing, and a positive signal is applied to the cathode of the diode 460, the transistors 464 and 502 are biased into conduction in response to a timing pulse of the waveform 610 applied to the lead 438, to apply a positive writing pulse of the waveform 158 (FIG. 11) to the lead 226. When a negative signal is applied to the anode of the diode 482, that is, to permit writing, and a negative signal is applied to the anode of the diode 480 from the digit register 450, then the transistors 486 and 508 are biased into conduction in response to the timing pulse of the waveform 610 to apply a negative writing pulse to the write lead 226 having a duration of the write timing pulse of the waveform 417. When writing is not desired, the control flip flop 448 is set to the opposite state so that a negative signal is applied to the cathode of the diode 458 and a positive signal is applied to the anode of the diode 482 so that information stored in the flip flop 450 is not passed through the "and" gates 456 and 478.

For reading, a strobe signal of a waveform 513 applied from the delay line 330 to a lead 514 provides timing to sense control circuits such as 516 and 518. The lead 514 is coupled to the base of a p-n-p type transistor 518 which is biased through a resistor 520 to a +20 volt terminal 522. The emitter of the transistor 518 is coupled to ground and the collector is coupled to a lead 526 which in turn is coupled to the sense control circuit 518 and to a first winding 528 of a transformer 530 of the sense control circuit 516. The other end of the winding 528 is coupled to a −10 volt terminal 532.

The lead 224 of the winding 222 of the sense amplifier 220 of FIG. 8 applies a sensed binary signal during reading from the first bit position through the lead 224 to the base of a p-n-p type transistor 536 of a two state amplifier. The lead 225 is coupled through a parallel arrangement resistor 538 and by-pass capacitor 540 to ground. The emitter of the transistor 536 is coupled to ground through a parallel arranged resistor 542 and by-pass capacitor 544. The collector of the transistor 536 is coupled to the base of a p-n-p type transistor 548 forming the second stage of the amplifier as well as through biasing resistors 550 and 552 to the resistor 538. The resistor 550 is also coupled to a source of −10 volt potential 554. The transistor 548 has an emitter coupled through a biasing resistor 558 to the terminal 554 and coupled to the base of a p-n-p type transistor 560 operating as an emitter follower. The collector of the transistor 548 is coupled through a parallel arranged biasing resistor 562 and capacitor 564 to ground. The collector of the emitter follower transistor 560 is coupled to the −10 volt terminal 554 and the emitter is coupled through a resistor 568 to ground.

The strobe pulse of a waveform 602 (FIG. 11) applied to the winding 528 of the transformer 530 develops a pulse in a second winding 570 which has a first end coupled through a parallel arranged resistor 572 and capacitor 574 to the cathode of a diode 576 included in a strobe gate. The second end of the winding 570 is coupled through a parallel arranged resistor 578 and capacitor 580 to the anode of a diode 582 forming the other half of the strobe gate. The anode of the diode 576 and the cathode of the diode 582 are coupled to the base of the transistor 560. Also, for proper biasing, the anode of the diode 582 is coupled to ground through resistor 586. In order that the strobe gate including the diodes 576 and 582 returns to the same D.C. level when opened and closed, a capacitor 581 is coupled between a center tap of the winding 570 and ground.

A sensed and amplified output signal of a first or a second polarity is applied from the emitter of the transistor 560 through a coupling capacitor 590 to a lead 592 to be utilized for arithmetic operations in the computer control system 335, for example. In response to a positive strobe pulse of the waveform 602 applied to the transformer 530 on the lead 526, the diodes 576 and 582 are biased out of normal conduction. Thus, a positive or negative sensed signal of the waveform 154 (FIG. 11) on the lead 224 is amplified by biasing the transistors 536 and 548 so as to vary the conduction of the transistor 560 to apply a positive or a negative signal to the lead 592 which may respectively represent a "one" or a "zero."

It is to be noted that the leads 299 and 234 coupled to the transformer 230 of FIG. 8 applies signals representing the sensed signal of the second bit position of a selected word to the sense control circuit 518, which in turn in response to the strobe signal on the lead 526 of the waveform 602, applies a binary signal to the computer system 335 through the lead 594. Similar sense control circuits are provided for each bit position of the memory system of FIG. 8, but are not shown for convenience of illustration.

Referring to the waveforms of FIG. 11 as well as to FIGS. 8, 9 and 10, the operation of the memory system in accordance with the invention will be explained in further detail. At time $T_0$ as determined by circuits in the computer control system 355, address pulses such as shown by the waveforms 596 and 598 are applied to each of the address register flip flops 370 and 372 of the address register, which flip flops are triggered to a binary state to select an address lead such as the lead 386. When a low level signal is applied from the flip flops 370 and 372 on the output leads coupled to the cathodes of the diodes 381 and 383, a negative pulse (not shown) is applied to the lead 386 to be maintained until the flip flops 370 and 372 are triggered to another combination. The X driver transistor 362 is thus biased into a ready state. Also, at time $T_1$ address inputs similar to waveforms 596 and 598 are applied to the flip flops 376 and 378 to select a lead such as 400 by applying low level outputs to the anode of the diodes 397 and 399. Thus, a high level signal is formed on the lead 400 and maintained until the flip flops 370 and 372 are triggered to another binary state. Therefore, the Y driver transistor 410 is biased to a ready state. The driver transistors 362 and 410 are thus selected to pass current through the bias plates 120 and 120*a* of the selected word when a read pulse of the waveform 345 is applied to the emitter of the transistor 362.

At time $T_1$, the read pulse of the waveform 345 is applied to the lead 344 to bias the transistor 346 into conduction to apply a positive pulse to the lead 360 from the transformer 350. A positive pulse similar to the waveform 345 except inverted is applied to the emitter of the transistor 362. Because only the driver transistors 362 and 410 have pulses applied to the bases, only those two selected transistors are biased into conduction. Thus, read current of the waveform 144 flows through the bias plates 120 and 120*a* to form a radial bias field for reading and writing, if desired, from the circularly oriented cores of the selected word. It is to be noted that the read current of the waveform 144 which develops the radial bias field may flow in either direction without changing the polarity of the sensed signal, as discussed previously.

Shortly after time $T_1$ as the circularly oriented magnetic elements or dipoles of each core are rotated, a sensed signal of the waveform 154 is induced on the central lead 138 being positive for a stored "one" and negative for a stored "zero," for example. Similar signals are formed on the central leads 208 and 209 representing the previously stored information of the second and third bit positions of the selected word.

The sensed signal of the waveform 154 is applied to the transformer 220 and through the lead 224 to the base of the amplifier transistor 536. Thus, the signal of the waveform 154 is amplified and applied through the second amplifying stage of the transistor 548 to the base of the emitter follower transistor 560. Because of the delay between the lead 224 and the base of the transistor 560, a strobe pulse of the waveform 602 developed from the pulse of the waveform 513 (FIG. 9) is applied to the transformer 530 at time $T_3$ as determined by the tap points of the delay line 330. Thus, the diodes 576 and 582 of the strobe gate are biased out of conduction shortly after time $T_3$ and the amplified signal similar to the waveform 154 is effective to control the transistor 560 to apply a positive or negative signal to the lead 592 and to the computer control system 335. The signal applied to the lead 592 may be similar to the waveform 154 except amplified with the polarity being positive or negative as determined by the polarity of a sensed signal 603 or 604 representing respectively a "one" or a "zero." The operation of the other sense control circuits such as 518 are similar except responding to the stored binary state in the second bit of the selected word, for example, to apply a positive or a negative signal to the lead 594 and to the computer control system 335.

Now that the address register flip flops 370, 372, 376 and 378 have been set to the binary combination to address the selected word and a bias current is passing through the bias conductors such as 120 and 120*a*, the write cycle may be performed if desired. As discussed previously, the cores will return to their initial state upon removal of the bias current applied through the bias plates 120 and 120*a*. Thus, the system in accordance with this invention may operate with non-destructive read out. However, if writing is desired, a write current pulse of the waveform 158 is applied to the central leads 138, 212, 208, 214, 209 and 211 at time $T_5$, with a positive pulse representing a "one" and a negative pulse representing a "zero," for example, and with the transformers such as 220 having a selected polarity relation. Writing is performed in response to the control flip flop 448 and the write timing pulse of the waveform 610. Any desired binary combination may be written into the cores of the three bit positions of the word selected by the continuing bias force developed by the conductors 120 and 120*a*. It is to be noted that the memory array of FIG. 8 may include any desired number of words and binary bits per word, being shown with 16 three bit words for convenience of illustration.

Writing during this cycle is selected when the write control flip flop 448 has been triggered to a selected binary state in response to a control signal similar to a waveform 608 applied from the computer control system 335, such as at a time $T_4$, so that a pulse of a positive polarity is applied to the cathode of the diode 458 and a pulse of a negative polarity is applied to the anode of the diode 482, effectively energizing the gates 456 and 478. Also at the time $T_4$, binary write information such as shown by the waveform 608 is applied to the write flip flops such as 450 which are triggered to a first or a second state depending on the polarity of the input signals. When the flip flop 450 is triggered to a state so that a voltage of a positive polarity is applied to the cathode of the diode 460, a positive signal is applied to the base of the transistor 464. As a result, the transistor 464 is biased into a ready state so as to conduct upon application of a write timing pulse of the waveform 610 applied shortly before the time $T_5$ to the lead 438. Also, in response to the voltage signal of positive polarity applied from the flip flop 450 to the anode of the diode 480, the "and" gate 478 is not opened and the transistor 486 is not biased to a state for conduction. In response to the pulse of the waveform 610 energizing the transformer 442 at time $T_5$ and applying a negative signal to the emitter of the transistor 464 and a positive signal to the emitter of the transistor 486, the transistor 464 is biased into conduction. The transistor 464 in turn applies a signal to the base of the transistor 502 to bias that transistor into conduction. Thus, for example, the positive current pulse of the waveform 158 representing a binary "one" is applied through the transistor 502 to the lead 226, to the center tap of the transformer 220 and through the center leads 138 and 212 to ground.

Because the radial bias force is maintained on the cores of the selected word in only the stack 162, the current pulse of the waveform 158 writes into only the core 104 in the selected word. If a "one" is stored in the core 104 of the first bit position, a positive current pulse of the waveform 158 representing a "one" maintains the core 104 saturated and the core remains at the condition of the stored state at the termination of the pulse. If a "zero" is stored in the core 104, the positive current pulse of the waveform 158 representing a one drives the core 104 to the opposite state or "one" state. The core 104 is written into a similar manner when a negative current pulse of the waveform 158 shown dotted to represent a "zero" is applied to the central lead 138.

When the flip flop 450 is triggered to a state so that a signal of a low voltage is applied to the cathode of the diode 460 and to the anode of the diode 480, the "and" gate 478 is biased into conduction and the negative current pulse of the waveform 158 is applied to the lead 226 and through the leads 138 and 212 representing a "zero." It is to be noted that a similar writing operation is simultaneously performed by the write control circuit 510 in response to the write information stored in the flip flop 452 by passing a selected positive or negative current pulse through the central lead 208 of the first core of the column 168 also having the radial bias force impressed thereon. A similar arrangement is provided for the first core of the coluumn 171 by passing a positive or negative current pulse through the central lead 209 in response to another write flip flop and circuit (not shown) similar to the write control circuits 444 and 510.

Thus, because in the memory of FIG. 8 only the first word of the stack 162 has a radial bias applied thereto through the bias plates 120 and 120*a*, only the bits of the selected word are permanently effected by the writing current. The cores of all unselected words in the stack 162 as well as in the stack 164 do not permanently change state in response to the writing current pulse such as of the waveform 158 which is of a relatively short duration.

The above described cycle is completed during the application of the writing current pulse of the waveform 158 and a short period until a time $T_0'$ is provided for circuit recovery such as discharge of capacitors therein. The next cycle of operation may be started at time $T_0'$ with the read and write operation similar to that discussed above, selecting a word at time $T_0'$ to pass a bias current through the bias plates adjacent to the selected word, applying a read current pulse of the waveform 144 through the central leads at time $T_1'$ and applying a strobe pulse of the waveform 602 to the sense control circuits at time $T_3'$. If writing is desired, that is, a destructive cycle, then new information is written into the selected word at time $T_5'$. Because of the delay line timing arrangement, the memory of the invention may be utilized with non-synchronous operation, that is, the time $T_0'$ of a cycle may be started whenever desired after completion of the previous cycle, in response to the initiate pulse of the waveform 334 applied to the lead 337 from the computer control system 335, for example. It is to be noted that because only one core in each column is being switched at the same time, the memory elements are closely spaced without one core affecting another when changing state.

The stack 164 functions in a similar manner to the stack 162 except the output signal for a "one," for example, may have an opposite polarity than for the stack 162. It is to be noted that the polarity sensed for a "one" or a "zero" may be opposite for the stacks 162 and 164 because write current of the waveform 158 flows in opposite directions into the two stacks. However, this difference may be handled either by reversing the action of the sense amplifier, reversing the current in the different write control circuits or having the computer control system 135 recognize the difference in sensed polarity for different stacks.

As an example of the short period of time required for a read write cycle in the high speed memory system in accordance with this invention, if time $T_0$ is zero time, time $T_1$ is at 30 nano-seconds, time $T_5$ is at approximately 40 nano-seconds and time $T_0'$ is at approximately 90 nano-seconds. If desired, the write current may be terminated at the termination of the read current.

Referring now to FIG. 13, another arrangement of the memory array and system in accordance with this invention utilizes separate sense leads and write leads rather than the center tapped balanced transformer arrangement of FIG. 8. Four parallel stacks 614, 616, 618 and 620 are shown each with four separate columns such as columns 625, 627, 629 and 631, and each including four cores such as 622. Thus, the memory array shown in FIG. 12 includes 4 words of 4 bits each in each of the four stacks or a total of sixteen words. Each word includes four binary bits but as indicated by the broken section may include any desired number of bits. It is to be noted that the memory array of FIG. 12 may have any desired numbers of words and bits per word. The stacks such as 614, 616, 618 and 620 include glass substrate plates 626, 628, 630 and 632, with each plate being utilized for all memory elements at each level. Bias plates or conductors are provided for each word such as bias plates 638 and 638*b* for the word line at the top of the stack 614. Also provided in the stack 614 are bias plates or conductors 640, 640*a*, 642, 642*a*, 644 and 644*a* so that each memory element such as 623 has a bias plate on both sides of the core such as 622. The bias plates on the two sides of each substrate such as bias plates 638 and 638*a* of the substrate 626 are connected at the end such as indicated at 644 similar to the arrangement of FIG. 7. The stack 620 is similar, including bias plates or conductors 464 and 464*a* for the memory elements of the plate 626, bias plates 648 and 648*a* for the memory elements of the plate 628, bias plates 650 and 650*a* for the memory elements of the plate 630 and bias pltaes 652 and 652*a* for the memory elements of the glass plate or substrate 632.

The stacks 616 and 618 have similar bias plates such as bias plates 653 and 653*a* for the first word of the stack 616 and bias plates 654 and 654*a* for the first word of the stack 618. In order that the bias plates of adjacent glass plates do not conduct current to each other, insulating sheets 655, 657 and 659 are provided and may be of any non-conductive material such as Teflon or Mylar. Also, an insulating material such as silicon monoxide is placed between each core such as 622 and the adjacent bias plate such as 638, as discussed relative to FIG. 7.

For selecting the bias plates of a single word such as the bias plates 638 and 638*a*, an arrangement of switching diodes is provided. In order to select in the X direction, X selection leads 245*a*, 250*a*, 264*a* and 272*a* are provided corresponding to the similar leads without a subscript shown passing into the memory array 369 of FIG. 10. A diode 656 has an anode coupled to the $X_1$ selection leads 245*a* and a cathode coupled to the bias plates 638, 653, 654 and 646 which are the top bias plates of the glass plate 626. A diode 658 has an anode to cathode path coupled between the $X_2$ selection lead 250*a* and the four top bias plates of the glass plate 628 such as 640 and 648. Similarly, a diode 660 has an anode to cathode path coupled between the $X_3$ selection lead 264*a* and the four top bias plates of the glass plate 630 such as bias plates 642 and 650 and a diode 662 has an anode to cathode path coupled between the $X_4$ selection lead 272*a* and the four top bias plates of the glass plate 632 such as the bias plates 644 and 652. Thus, energizing one of the X selection leads 245*a*, 250*a*, 264*a* and 272*a* by applying a positive pulse thereto selects the four words positioned on a selected one of the glass plates 626, 628, 630 or 632 which is defined as selection in the X direction.

For selection in the Y direction defined as selection of one of the stacks 614, 616, 618 or 620, Y selection leads 284*a*, 290*a*, 296*a* and 301*a* are provided corresponding to the Y selection leads passing into the memory array 369 of FIG. 10 having similar reference numbers but without subscripts. Diodes 666, 668, 670 and 672 have anode to cathode paths respectively coupled between the bias plates 638*a*, 640*a*, 642*a* and 644*a* and the $Y_1$ selection lead 284*a*. Thus, the Y selection leads are coupled to the lower bias plates of the glass plates 626, 628, 630 and 632. Diodes 676, 678, 680 and 682 have an anode to cathode path respectively coupled between the lower bias plates such as 653*a* of the stack 616 and the $Y_2$ selection lead 290*a* and diodes 686, 688, 690 and 692 respectively have an anode to cathode path coupled between the bottom bias plates of the stack 618, such as the bias plate 654*a*, to the $Y_3$ selection lead 296*a*. In a similar manner, diodes 696, 698, 700 and 702 have an anode to cathode path coupled respectively between the bias plates 646*a*, 648*a*, 650*a* and 652*a* and the $Y_4$ selection lead 301*a*.

To select a word such as the top word of the stack 614, one of the Y selection leads such as 284*a* is energized by applying a negative pulse thereto so that current flows from an energized $X_1$ selection lead such as 245*a*, through the diode 656, serially through the bias plates 638 and 638*a*, and through the diode 666 to the $Y_1$ selection lead 284*a*. Thus, the selection arrangement of FIGS. 9 and 10 may be utilized to select words of the memory array of FIG. 12 by substituting the X selection leads 245*a*, 250*a*, 264*a* and 272*a* respectively for the X selection leads 245, 250, 264 and 272 and by substituting the Y selection leads 284*a*, 290*a*, 296*a* and 301*a* respectively for the Y selection leads 284, 290, 296 and 301.

In order to eliminate the balanced transformers of FIG. 8, separate sense and control leads are provided with the direction of winding reversed in each stack. A sense lead 720 is wound through the column 625 from bottom to top as a lead 720*a* and down through the column 629, through the column 627 from bottom to top as a lead 720*b* and down through the column 631 to ground. A control lead 724 is wound through the column 625 from bottom to top as a lead 724*a*, down through the column 627, through the column 629 from bottom to top as a lead 724*b* and down through the column 631 to ground. Thus, the sense lead 720 and the control lead 724 for writing are transposed and can be utilized for sensing and writing without interfering with one another. A similar arrangement is provided for the columns of each bit position of the words such as a sense lead 728 and a write lead 730 for the second bit positions of the words. Because the sense lead such as 720 and the write leads such as 724 pass through alternate columns in opposite directions, the induced voltages during writing are cancelled in the sense lead 720 so as to eliminate the necessity of a balanced transformer arrangement.

It is to be noted that the bias conductors such as 638, 653, 654 and 646 and the corresponding columns are shown reversed in polarity which may be a desired construction. However, as discussed previously the polarity of the bias field is arbitrary so that the loops of the bias conductors such as 638 and 653 and the respective columns 625 and 627 may be in either direction or polarity. Also, a switching arrangement may be utilized, if desired, that passes current in either direction through the pairs of bias plates such as 638 and 638*a*. Also, because the circularly oriented cores such as 622 have two stable states, the positioning of the cores such as 622 in the reversed bias plates is arbitrary.

Figure 4:
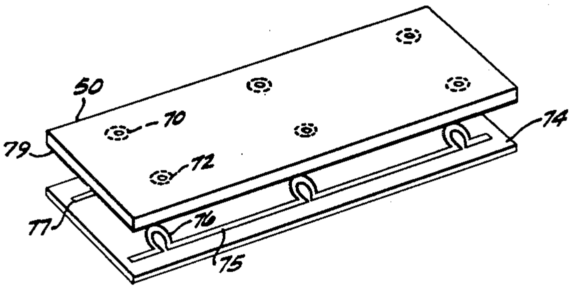
FIG. 4 is a schematic perspective drawing of a masking arrangement to be utilized in the vacuum equipment of FIG. 2 for forming the bias conductors of a completed memory element in accordance with this invention utilizing the circular oriented cores of FIG. 1.

The construction of the glass bias plates and the cores may be similar to that shown and discussed relative to FIGS. 3 and 4. Also, the bias plates may be an etched conductor such as copper pressed on the glass substrate.

Figure 11:
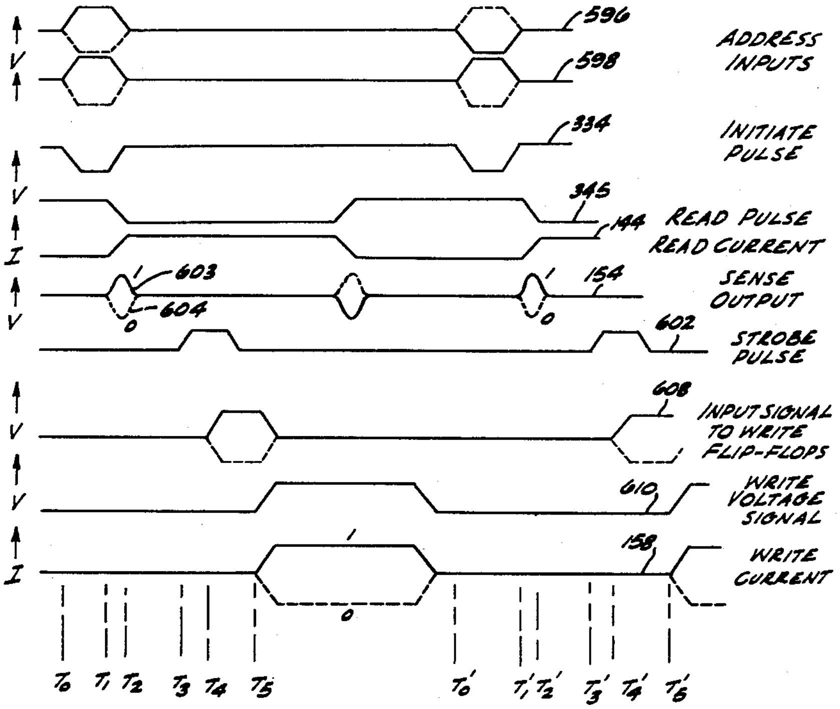
FIG. 11 is a diagram of waveforms for explaining the operation of the memory array of FIG. 8 and the circuits of FIGS. 9 and 10.

Referring now to FIGS. 9, 10 and 11 as well as to FIG. 12, at time $T_0$ a word is addressed by triggering the address register flip flops 370, 372, 376 and 378 to a selected binary state in response to address pulses similar to the waveforms 596 and 598. At time $T_1$ a word is read by passing a read current pulse similar to the waveform 144 through the selected bias plates such as 638 and 638*a* in response to the read timing pulse similar to the waveform 345 applied to the emitters of the X selection transistors. Also, at time $T_1$ a signal similar to the waveform 154 is sensed on the sense leads such as 720 and applied to the sense control circuits such as 516, that is, through the resistor 538 to ground and to the base of the transistor 536. Thus, as discussed above, a signal representing an interrogated "zero" or "one" is applied to the lead 592 at time $T_3$ in response to a strobe pulse similar to the waveform 602. Simultaneously, binary signals are developed on the other sense leads such as 728 and applied to the other sense control circuits such as 518.

At time $T_4$, if writing is desired, the control flip flop 448 is triggered to a write state and binary information is written into the flip flops such as 450 and 452. At time $T_5$, a write current pulse having a selected polarity or direction similar to the waveform 158 is applied to each of the control leads such as 724 and 730, and because of the presence of the bias pulse of the waveform 144, the cores of the selected word are changed to the binary state represented by the write pulse or remain in the state represented by the write pulse. The lead 226 of the write control circuit 444 is coupled to the control lead 724 and the lead 236 of the write control circuit 510 is coupled to the control lead 730. Other control leads of the memory array of FIG. 12 are coupled to similar write control circuits (not shown). Because the operation of the memory array of FIG. 12 is similar to that described for the memory array of FIG. 8, it will not be explained in further detail.

The memory arrays of FIGS. 8 and 12 are highly compact so that a relatively small length of sense and control conductors are required, thus resulting in a high speed of operation. Because of the closed loop operation of the circularly oriented cores, that is, because the lines of flux are maintained within the film material of the cores, the memory elements may be placed close together without the field of one element interfering with the core in an adjacent element. Because of the relatively low coercivity of the core of the invention, the switching current of the waveform 158 may be substantially less than with conventional cores.

Another arrangement of a memory element in accordance with this invention may have a simplified construction as shown in FIG. 13 which utilizes a conducting substrate instead of a second bias conductor. A substrate plate 750 may be formed of a suitable conducting material such as aluminum and may be rectangular in configuration. The thin film cores such as 754 and 756, which are of a suitable magnetic material such as an iron-nickel compound, may be deposited onto the plate 750 by the methods previously discussed. On top of the cores, a thin film 758 may be placed of non-conductive material such as Teflon or Mylar. The film 758 when depositing techniques are utilized, may be silicon monoxide. A bias plate or conductor 760 is positioned on top of the film 760 with the partially circular portions 764 and 766 positioned at the respective cores 754 and 756 similar to the arrangements previously discussed. The bias conductor or plate 760 which may be copper is formed by techniques such as evaporation, electro deposition or by attaching etched copper to the plate 750.

In operation of the memory elements of FIG. 13, the bias plate 760 is coupled to the plate 750 such as at 780. A bias current pulse is thus passed through the bias plate 750 and through the rectangular plate 750. It is to be noted that the bias plate 760 has the circular portions 764 and 766 which are not present in the flat plate 750. Current flowing through the bias conductor 760 in a direction, for example, shown by arrows 765 and 767 induces eddy currents in the plate 750 at the sections 764 and 766. These eddy currents form the well known mirror effect that results in a condition similar to that which would be produced by a complementary conductor, that is, one of the same shape as the bias plate 760, spaced below the surface of the plate 750 the same distance as the bias conductor 760 is above the plate 750. To further explain the operation, the conducting plane near and parallel to the cores such as 754 and 756 will short circuit any flux lines that will tend to develop perpendicular to the conducting plane of the plates 750 and 756. Thus, the plate 750 is also the substrate for the cores and a simplified structure is provided.

Central conductors such as 782 and 784 are positioned through holes 786 and 788 in the cores 754 and 756 and the plate 750. The conductors 782 and 784 function similar to the arrangements previously discussed for sensing and for writing, and will not be explained in further detail. Also, it is to be understood that separate sense conductors and control conductors may be utilized in the arrangement of FIG. 13 in accordance with the principles of FIG. 12. It is to be noted that a sensed signal has a polarity independent of the direction of the bias current, as previously discussed.

Thus, in accordance with this invention, there has been described an improved memory element capable of non-destructive read-out. Because of the circular switching field and the circularly oriented core, the core may be switched with a relatively low power. As the cores have a closed internal magnetic path, the memory elements may be closely spaced to form a compact memory system. Thus, the memory systems in accordance with the invention have a high speed of operation because of the short lengths of conductors required in the compact arrangement. Also, the memory elements and systems of the invention are simply and easily constructed.

What is claimed is:

1. A switching element comprising a core having magnetic elements oriented circularly around an axis, bias means magnetically coupled to said core for developing a radial magnetic field relative to said axis, and conductor means positioned substantially along said axis for developing a circular magnetic field.

2. A binary storage element comprising a thin film core having a closed circular magnetic path around an axis, bias means positioned to be magnetically coupled to said core to form a field radial to said axis, and conducting means positioned substantially along said axis for forming a circular field around said axis.

3. A memory element comprising a thin film core having an axis and circularly oriented magnetic elements, means for selectively applying a radial field to said core relative to said axis, a conductor positioned substantially along said axis, and means coupled to said conductor for responding to said radial field to sense a stored magnetic state in said core and for selectively applying a writing current through said conductor for changing the magnetic state of said core.

4. A binary storage element comprising a circularly oriented magnetic core having an axis, means for selectively applying a magnetic field to said core radial relative to said axis, and means positioned through said core for sensing signals representative of the stored magnetic state of said core in response to the radial field and for selectively applying a circular magnetic field to said core to change said core to an opposite magnetic state in the presence of said radial field.

5. A binary memory element capable of being non-destructively read in response to a bias current comprising a thin film core having a first and second side and an axis with circularly oriented magnetic elements around said axis, first and second bias conductors positioned around said axis respectively adjacent to the first and second sides of said core, and a central conductor positioned through said core, whereby in response to said bias current passing through said first and second bias conductors, a signal is formed in said central conductor representative of a stored binary state in said core and at the termination of said bias current, said core returns to the stored binary state.

6. A binary memory element comprising a conducting plate, a thin film core positioned on said conducting plate, said core having a central axis and magnetic dipole elements thereof circularly oriented around said axis, a bias conductor adjacent to said core on a side opposite from said conducting plate and providing a circular current path around said axis, a conductor positioned through said core substantially along said axis, means for applying a bias current through said conducting plate and said bias conductor for applying a radial bias field to said core, and means for passing a current pulse through said conductor for applying a circular field to said core, said core developing a signal having a polarity representative of a stored magnetic state in response to said radial bias field and changing magnetic state only in the presence of said radial bias field and said circular field.

7. A binary element comprising a magnetizable thin film core having first and second flat surfaces and an axis perpendicular to said surfaces, said core having circular magnetic orientation around said axis, a first conductor adjacent to the first side of said core forming an arc around said axis, a second conductor adjacent to the second side of said core and forming an arc around said axis, conducting means positioned through said core substantially along said axis, means for passing bias current through said first and second conductors to apply a radial bias field to said core, and means for applying switching currents to said conducting means for applying a circular field to said core, said core switching from one binary state to the other only in the presence of said radial bias field and said circular field.

8. A memory element comprising a core having circularly oriented magnetic elements and having a centrally disposed opening, a conductor passing through said opening, a first bias conductor positioned on a first side of said core for forming a circular current path around said opening in a first direction, and a second bias conductor positioned on the second side of said core for forming a circular current path around said opening in a second direction, current flowing through said bias conductors forming a radial magnetic field and current flowing through said conductor in a first or a second direction forming a circular field in respectively a first or second direction around said opening.

9. A binary memory element comprising a conducting plate, a thin film core having a first and a second side and having said first side positioned adjacent to said conducting plate with an axis at right angles thereto, said core formed of material having magnetic molecular elements thereof circularly oriented around said axis, a bias conductor positioned adjacent to the second side of said core and providing a current path of a segment of a circle around said axis, and a central conductor positioned through said core substantially along said axis, whereby a bias current applied through said conducting plate and said bias conductor develops a radial field so that said core induces a signal in said central conductor having a polarity representative of the binary state of said core and a write current applied to said central conductor in a selected direction develops a circular field which in the presence of said radial field switches said core to a selected opposite magnetic state.

10. A binary memory element for non-destructive reading comprising a thin film core having a centrally disposed opening and having magnetic dipole elements circularly oriented around said opening to form a closed magnetic path, said core having first and second stable magnetic states, a central conductor positioned through said opening, a first bias conductor positioned adjacent to a first side of said core to form current path in a first direction through a segment of a circle around said opening, a second bias conductor positioned adjacent to a second side of said core to form a current path in a second direction through a segment of a circle around said opening, means coupled to a central conductor for passing a current therethrough in a selected direction for forming a circular writing field in the first and second direction around said opening, and means coupled to said bias conductors for passing current therethrough to form a radial field, whereby said radial field moves said dipole elements to form a signal in said central conductor indicative of the stored first or second magnetic state without permanently changing said magnetic state and said circular field in the presence of said radial field changes said dipole elements so as to change said core to the opposite magnetic state.

11. A binary memory element for providing non-destructive reading comprising a thin film core having first and second stable magnetic states, having first and second sides with a centrally located axis at right angles thereto, having a circular shape and having a centrally disposed opening at said axis, said core having magnetic elements thereof circularly oriented around said axis, a first bias plate positioned adjacent to said first side of said core and having a current path around said axis, a second bias plate positioned adjacent to said second side of said core and having a current path around said axis, a conductor passing through said opening, bias means coupled to said bias plates for passing a bias current through said bias plates in opposite directions around said axis so as to form a radial bias field, and means coupled to said conductor for passing write current therethrough in a selected direction and for responding to said core in the presence of said bias current for sensing a stored first or second magnetic state, whereby during reading said bias field influences said magnetic elements to induce a signal on said conductor representative of the stored magnetic state with said core returning to the stored magnetic state at the termination of said bias field and during writing said circular field in the presence of said bias field switching said core to a selected first or second magnetic state when other than said stored magnetic state.

12. A binary storage element capable of being switched in response to coincidence of a radial field and a circular field and capable of providing an indication of a stored binary state without changing the stored binary state comprising a thin film core having a first and second flat surface and an axis perpendicular to said flat surfaces, said core having magnetic dipole elements oriented in a circular manner around said axis, a first bias conductor positioned adjacent to the first side of said core for passing current in an arc around said axis, a second bias conductor positioned adjacent to the second side of said core for passing current in an arc around said axis, a conductor positioned through said core substantially coincident with said axis, means coupled to said first and second bias conductors for passing current therethrough for applying a radial bias field to said core, and means coupled to said conductor for passing current therethrough to apply a circular field to said core in a selected first and second direction around said axis for writing into said core in the presence of said radial field, said core responding to said radial field alone to apply a signal to said means representative of the stored binary state of said core.

13. A memory system comprising a plurality of thin film cores arranged in rows and columns, said cores having circular magnetic orientation, a plurality of bias conductors each passing along first and second sides of a different row of cores and having a configuration for responding to current to develop a radial bias field at said cores, conducting means passing through each column of cores, selection means coupled to said bias conductors for passing bias current thereto to develop said radial field, said core responding to said radial field to develop a read-out signal in said conducting means indicative of a stored magnetic state, and means coupled to said conducting means for responding to said read-out signal and for selectively applying a write pulse so as to apply circular magnetic fields to said cores of the selected row, said cores changing to an opposite magnetic state only in response to coincidence of said radial bias field and said circular field.

14. A memory system comprising a plurality of thin film cores, said cores being circular, having a central opening and having magnetic dipole elements, said dipole elements being circularly oriented around said opening, a plurality of first and second bias plates each having a plurality of extensions having the shape of a portion of a circular disc, said first and second bias plates positioned adjacent to each other in pairs with one of said cores positioned between each of said extensions of each pair of bias plates, a first portion of said pairs of bias plates positioned in a first stack and a second portion positioned in a second stack to form columns including cores and extensions of said bias plates, a plurality of first and second conductors respectively positioned through the corresponding columns of said first and second stacks, a plurality of connecting means each having a first, second and third terminal, each of said first and second terminals coupled to a first and second conductor, diode selection means coupled to said pairs of bias plates of said first and second stacks for passing bias current through a selected pair of first and second bias plates to develop a radial bias field, said radial bias field disturbing said magnetic dipole elements to apply a read signal through said central conductor to said connecting means, and writing means coupled to each of said second terminals for applying write current pulses through said conductors in a selected direction, said cores in the selected pair of bias plates having a radial bias field applied thereto being responsive to said write current pulses.

15. A thin film memory system comprising a plurality of circular thin film cores having a central axis and an opening thereat, said cores having magnetic dipole elements circularly oriented around said axis, a plurality of first and second bias conductors, each bias conductor having a plurality of partially circular sections with a central opening at each section for passing current in a partially circular path around said opening, said plurality of first and second bias conductors arranged in first and second stacks, said circular sections of a first and a second part of said bias conductors in each stack arranged in columns with a core between each of said first and second bias conductor, the sections of each pair of bias conductors forming different bit positions of a word, a plurality of central conductors, each positioned through the openings in said cores and bias conductors of columns of said first and second stacks representing corresponding bit positions, word selection means coupled to said bias conductors for passing bias current through a selected first and second bias conductor to apply a radial bias field to cores of a selected word for moving the magnetic dipoles thereof so as to develop a read-out signal in said central conductor, said read-out signal having a polarity representative of the stored magnetic state, and means coupled to said central conductors for responding to said read-out signal and for selectively passing a write current pulse through said conductors in a selected first or second direction to apply circular writing fields to said cores, said cores responding only to a coincidence of said radial bias field and said circular field for being switched to an opposite magnetic state, whereby the stored states of the cores of said selected word may be read without changing the stored magnetic state and writing may be selectively performed.

16. A memory system comprising a plurality of substrate plates arranged together, a plurality of thin film cores positioned on a first side of each of said plates in word rows, said cores in corresponding positions of said plurality of plates forming columns, said cores having a central axis and a central opening and having magnetic elements thereof circularly oriented around said axis, corresponding cores in said plurality of word rows representing similar bit positions of said words, a plurality of first and second bias plates in each row respectively on a first and second side of said substrate plates, each of said bias plates having an extension for passing current in an arc around said axis of each core, said first and second bias plates of each substrate connected at a first end of the rows, a plurality of write conductors for passing current with each one positioned through all of the columns of cores of a different bit position of said rows, a plurality of sense conductors with each one positioned through all of the columns of cores of a different bit position of said rows so as to pass current in respective adjacent columns in the same and in the opposite direction of said write conductors, addressing means coupled to said bias plates to pass current through a selected first and second bias plate and apply a radial bias field to the cores of the selected word, read control means coupled to said sense conductors for responding to a read signal of a first or second polarity resulting from said radial bias field, and write control means coupled to said write conductors for passing a current through said write conductor in a selected direction so as to apply circular write fields to said cores, said cores of said selected word responding to coincidence of said bias field and said circular write field to change to an opposite magnetic state.

17. A thin film memory system comprising a plurality of plates of non-conducting material having first and second sides, a plurality of thin film cores positioned in a plurality of rows on the first side of each of said plates, the cores of each row representing a word, said plates positioned adjacent to each other so that said cores are arranged in columns, each core having a central axis and an opening thereat and being formed of material with magnetic dipole elements thereof circularly oriented around said axis to provide closed loop for internal flux paths, a plurality of pairs of first and second bias conductors respectively positioned on said first and second sides of each of said plates and having partially circular sections with a central axis positioned coincident with the axis of said cores and an opening at said axis, said bias conductors providing a partially circular path for current flow around said axis, a plurality of first and second conducting means positioned through the openings in said cores and bias plates, each conducting means positioned through corresponding columns of each row, addressing means coupled to said bias conductors for passing a bias current through a selected pair of first and second bias conductor for applying a radial bias field to the cores of the selected word, said bias field disturbing said magnetic dipole elements to develop a read-out signal in each of said first conducting means having a polarity representative of the stored magnetic state in said core, writing means coupled to said second conducting means for passing a writing current therethrough having a selected direction to form a circular writing field, said cores responding to the coincidence of said radial field and said circular writing field for being switched to an opposite magnetic state, and control means coupled to said writing means for selectively writing during the application of said bias current.

References Cited in the file of this patent

UNITED STATES PATENTS 2,792,563 Rajchman ------------- May 14, 1957